United States Patent [19]

Hattori et al.

[11] Patent Number: 4,632,231
[45] Date of Patent: Dec. 30, 1986

[54] METHOD OF CONTROLLING THE STARTING OF A VEHICLE HAVING AUTOMATIC CLUTCH

[75] Inventors: Toshihiro Hattori, Ayase; Masaki Ishihara, Fujisawa; Makoto Uriuhara, Yokohama, all of Japan

[73] Assignee: Isuzu Motors Limited, Tokyo, Japan

[21] Appl. No.: 625,610

[22] Filed: Jun. 28, 1984

[30] Foreign Application Priority Data

Jun. 30, 1983 [JP] Japan .................. 58-118461
Jun. 30, 1983 [JP] Japan .................. 58-118462

[51] Int. Cl.$^4$ ............................................ B60K 41/02
[52] U.S. Cl. .......................... 192/0.076; 192/103 R
[58] Field of Search ............. 192/0.076, 0.075, 0.073,
192/0.055, 0.044, 0.09, 103 R, 0.052

[56] References Cited

U.S. PATENT DOCUMENTS

| | | | |
|---|---|---|---|
| 4,267,914 | 5/1981 | Saar | 192/103 R X |
| 4,331,226 | 5/1982 | Heidemeyer et al. | 192/0.076 |
| 4,403,682 | 9/1983 | Norris et al. | 192/0.076 X |
| 4,418,810 | 12/1983 | Windsor | 192/0.076 |
| 4,488,625 | 12/1984 | Hobumoto et al. | 192/103 R |
| 4,497,397 | 2/1985 | Windsor et al. | 192/0.076 |
| 4,509,625 | 4/1985 | Tellert | 192/103 R X |

FOREIGN PATENT DOCUMENTS 0059035 5/1982 European Pat. Off. .

OTHER PUBLICATIONS

European Search Report, completed Sep. 18, 1984, by Examiner Denk at Vienna

*Primary Examiner*—George H. Krizmanich
*Attorney, Agent, or Firm*—Staas & Halsey

[57] ABSTRACT

A method of controlling the starting of a vehicle having an engine, an automatic clutch and an electronic control system which detects the extent of depression of an accelerator pedal and determines the speed of operation of a clutch actuator based on the detected extent of depression of the accelerator pedal. In particular, the method includes detecting a load on the engine due to a change in the condition in which the clutch is engaged, and stopping connection control of the clutch when the detected load on the engine is increased, to prevent an engine stop. In addition correction is made to vary the speed at which the vehicle starts linearly with respect to the extent of depression of the accelerator pedal.

2 Claims, 12 Drawing Figures

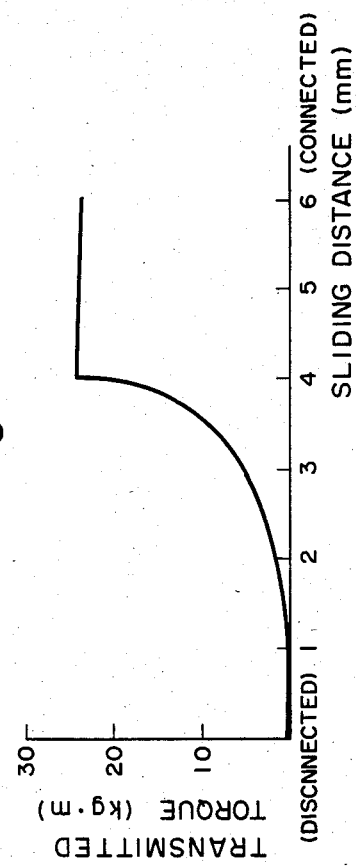
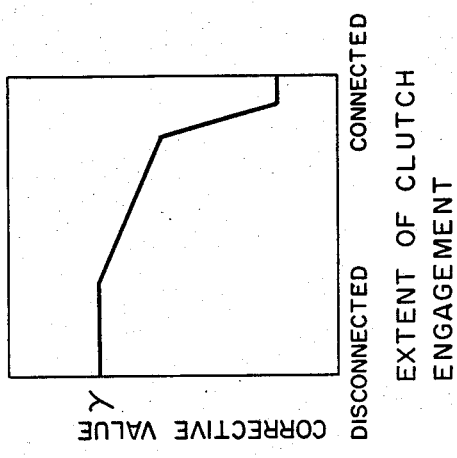
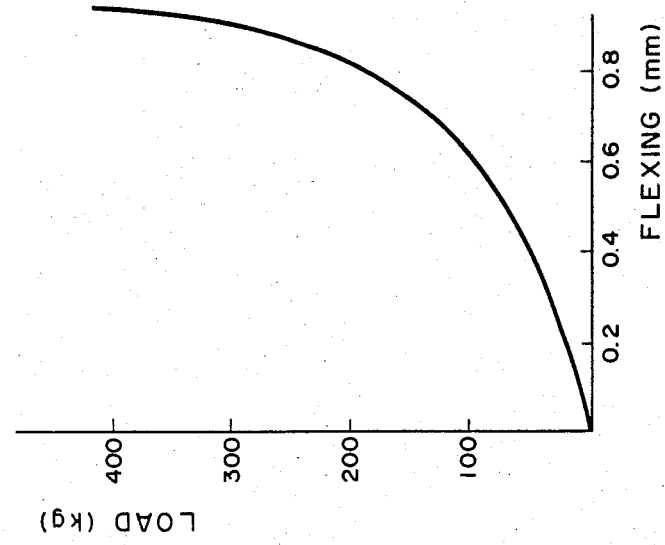

METHOD OF CONTROLLING THE STARTING OF A VEHICLE HAVING AUTOMATIC CLUTCH

BACKGROUND OF THE INVENTION

The present invention relates to a method of controlling the engagement of an automatic clutch, particularly, the starting of a vehicle having an automatic clutch, by controlling the clutch and an engine on the vehicle at the time the vehicle is started. More particularly, a method of controlling the starting of a vehicle having an automatic clutch for preventing the racing of the engine when operating the clutch, preventing a vehicle starting response from being lowered, and allowing the vehicle to start without suffering from an engine stop or knocking.

Vehicles with automatic transmissions can easily be operated and have widely been used in recent years. Some vehicles have automatic clutches which comprise, instead of torque converters, friction clutches (dry-type single-disc clutches) controlled by fluid-controlled actuators.

Various methods of controlling the automatic clutch have been proposed to permit the vehicle to start smoothly. According to Japanese Patent Publication No. 50-12648, for example, the condition of engagement of the clutch is gradually varied as the number of r.p.m. of the engine is increased. Japanese Laid-Open Patent Publication No. 52-5117 discloses an automatic clutch control method for varying the speed at which the clutch is engaged according to the number of r.p.m. of the engine.

A vehicle with an automatic clutch can be operated in the same manner as that in which conventional vehicles having automatic transmissions with torque converters can be operated. When starting the vehicle, the driver depresses the accelerator pedal to a certain depth and keeps the accelerator pedal depressed until a desired vehicle speed is achieved.

With the torque converter, the engine is subjected to a load at all times, and hence the rate of rotation will not increase dramatically no matter how the accelerator pedal is depressed. The acceleration torque can be increased since a large toque ratio can be obtained by increasing the number of r.p.m. of the engine to increase the slip ratio of the converter. Therefore, the torque converter is advantageous for the above conventional manner of starting the vehicle.

The automatic clutch comprising the friction clutch is engaged after the rate of rotation of the engine has been increased. Thus, the rate of rotation of the engine is substantially increased when the clutch starts being connected. Since the vehicle is held at rest before the clutch is connected, the engine tends to race or run at a high r.p.m. and thus, the clutch slips to a large extent while it is connected incompletely. Therefore, the clutch wears rapidly and has a reduced service life, and the fuel economy of the vehicle is poor. It takes a certain period of time for the rate of engine rotation to increase after the driver has depressed the accelerator pedal. Because the clutch is controlled by the increasing rate of engine rotation, the starting response of the vehicle is lowered. With the poor starting response, the vehilce is slow to start moving, and the driver is then liable to depress the accelerator pedal to a greater depth, with the result that the clutch will have a shorter service life and the fuel economy will get worse.

SUMMARY OF THE INVENTION

It is an object of the present invention to provide a method of controlling the starting of a vehicle having an automatic clutch for preventing an engine from racing at the time the vehicle is started, improving a starting response of the vehicle, preventing an engine stop or knocking, and allowing the vehicle to start moving smoothly.

The present invention is based on the invention disclosed in the application filed on July 30, 1983 in Japan (Japanese Patent Application No. 110460/1983) by the same applicant. According to a first process in said invention filed in Japanese Patent Office, an extent of depression of an accelerator pedal is detected, and a speed of operation of a clutch actuator is determined from the detected extent of depression of the accelerator pedal to ensure smooth clutch operation and vehicle starting response. In a second process, an optimum number of r.p.m. of a gasoline engine or a diesel engine is established, the number of r.p.m. of the engine is determined, and a throttle valve for the gasoline engine or a fuel supply device such as a fuel injection pump for the diesel engine is controlled dependent on the difference between the number of r.p.m. of the engine and the optimum number of r.p.m., so that the number of r.p.m. of the engine will be equalized to the optimum number to prevent engine racing and poor fuel economy.

With said invention filed in Japanese Patent Office, however, the number of r.p.m. of the engine is controlled to be equal to the optimum number. Therefore, when the vehicle starts slowly on a slope or runs at a low speed, the engine output power tends to be insufficient as compared with a load on the vehicle, resulting in the risk of engine knocking or stop.

According to the present invention, an engine load (that is, vehicle load) due to a change in the condition in which the clutch is engaged is detected, and when the engine load is increased, connection control of the clutch is stopped.

According to one aspect of the present invention, an increase in the engine load is detected by detecting a rate of change in the number of r.p.m. of the engine and also detecting when the detected rate of change in the number of r.p.m. of the engine becomes negative. According to another aspect of the invention, an increase in the engine load is detected by detecting an extent of engagement of a friction clutch, determining a limit number of r.p.m. of the engine corresponding to the extent of engagement of the clutch, and also detecting when the detected number of r.p.m. of the engine is lower than the limit number of r.p.m. of the engine.

If the control of the speed of engagement of the clutch (that is, the speed of operation of a clutch actuator) is determined only from the extent of depression of an accelerator pedal, the acceleration of the vehicle, while the clutch is being controlled to be connected, sometimes increases rapidly at a certain condition of clutch engagement for the same extent of depression of the accelerator pedal. This would cause the driver to feel an abnormal response in vehicle driving operation, and result in danger due to an abruptly increases vehicle speed. Such a condition occurs since the frictional members of the clutch have cushioning characteristics (flexing vs. load characteristics of the frictional members), as shown in FIG. 1 of the accompanying drawings, and the torque transmitted by the clutch depends on the extent of sliding movement of the clutch actuator (torque characteristics) is represented by an N-th order curve as shown in FIG. 2.

To correct the torque characteristics to achieve a linear relation, according to the present invention, the extent of engagement of the clutch is detected, a corrective value is determined from the detected extent of clutch engagement, and the clutch is controlled to be connected at a speed obtained by correcting a speed determined from the extent of depression of the accelerator pedal with the determined corrective value. Therefore, the speed of operation of the clutch actuator is varied dependent on the extent of depression of the accelerator pedal and the extent of engagement of the clutch.

Since the speed of operation of the clutch actuator is determined from the extent of depression of the accelerator pedal, the clutch can be operated smoothly and the vehicle can be started with a smooth response. In addition, the optimum r.p.m. of the engine is established, the number of r.p.m. of the engine is detected, and the fuel supply device is controlled dependent on the difference between the optimum and detected numbers of r.p.m. of the engine. Accordingly, the number of r.p.m. of the engine while the clutch is being operated upon can be equalized with the optimum number of r.p.m. of the engine, so that the engine is prevented from racing and having poor fuel economy. As the optimum number of r.p.m. of the engine is proportional to the depression of the accelerator pedal, the vehicle starting response is more dependent on the intention of the driver.

The engine load due to a variation in the condition in which the clutch is engaged during connection control of the clutch is detected, and no clutch connection control is performed when the detected engine load is increased. Therefore, even when the engine output power is insufficient as compared with the vehicle load at the time the vehicle starts slowly on a slope or runs at a low speed, the engine is prevented from knocking or being stopped. As the number of r.p.m. of the engine is increased to produce sufficient engine output power, the clutch connection control is resumed thereby preventing the danger of leaving the clutch disconnected while the vehicle is on a slope or the like. The control system disclosed in the prior invention in the previously filed application is likely to allow an engine output power shortage to take place when the vehicle is started dependent on the vehicle condition since the number of r.p.m. of the engine is controlled so as to be equalized to the optimum number of r.p.m. of the engine. The present invention is particularly effective for use in such control system.

Furthermore, the extent of engagement of the clutch is detected, a corrective value is determined from the detected extent of clutch engagement, the determined speed of operation of the clutch is corrected by the determined corrective value, and the clutch is controlled to be connected at the corrected speed of operation. This prevents the vehicle acceleration from being rapidly increased due to the torque transmission characteristics of the clutch, prevents the driver from feeling an abnormal response, prevents the vehicle speed from being abruptly increased, and protects the vehicle from danger.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 1 is a diagram showing the cushioning characteristics of a clutch;

FIG. 2 is a diagram showing the torque transmission characteristics of a clutch;

FIG. 10 is a diagram showing the relationship between the extent of engagement of a clutch and a corrective value according to the present invention;

DESCRIPTION OF THE PREFERRED EMBODIMENT

Figure 3:
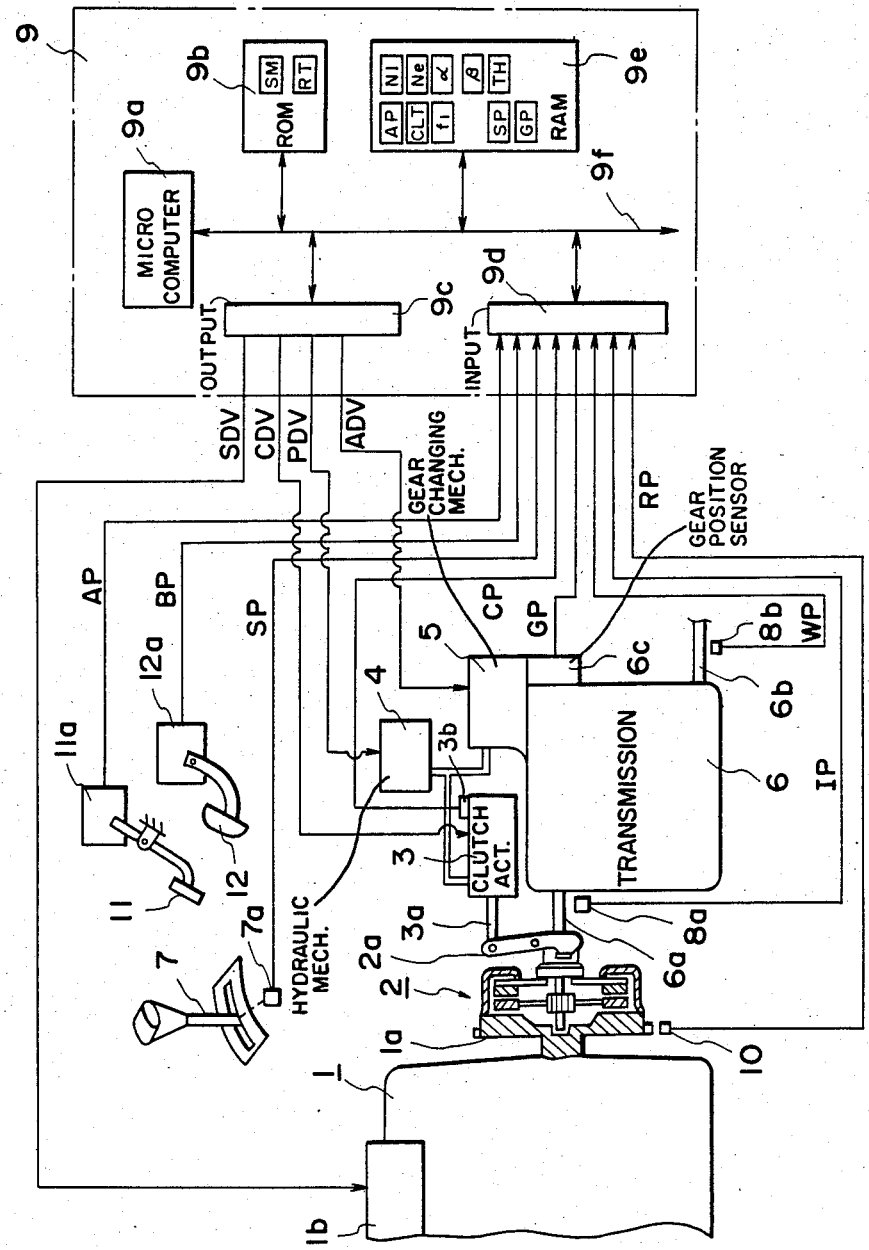
FIG. 3 is a block diagram of an automatic transmission control system by which a method of the present invention is carried out, and showing a clutch in cross section.

FIG. 3 shows an engine 1 including a fuel supply control device (not shown) such as a throttle valve or a fuel injection pump for controlling the amount of an air-fuel mixture introduced into engine cylinders, the engine 1 being connected to a flywheel 1a and a throttle actuator 1b comprising a stepping motor, for example, for controlling the fuel supply control device. A clutch 2 mounted on the flywheel 1a comprises a known friction clutch having a clutch release lever 2a. The extent to which the clutch 2 is engaged or connected is controlled by a clutch actuator 3 having a piston rod 3a connected to the clutch release lever 2a for actuating the clutch release lever. The clutch actuator 3 is operated by a hydraulic mechanism 4. A clutch actuator sensor 3b detects the extent of the clutch engagement.

A gear transmission 6 having a synchromesh system is actuated by a gear changing or transmission actuator assembly 5 for effecting desired gear changing operation. The gear transmission 6 has an input shaft 6a coupled to the clutch 2, an output shaft (drive shaft) 6b, and a gear position sensor 6c for detecting a selected gear position of the gear transmission 6.

A select lever 7 which is manipulated by the driver is selectively shiftable into an "N" range (neutral position), a "D" range (automatic gear changing position), a "1" range (1st gear position), a "2" range (2nd gear position), a "3" range (automatic gear changing position for 1st, 2nd and 3rd gears), and an "R" range (reverse gear position). The select lever 7 is associated with a select position sensor 7a for issuing a selection signal SP indicative of a selected range position.

A rotation sensor 8a is disposed in confronting relation to the input shaft 6a for detecting the number of r.p.m. of the input shaft 6a. A car speed sensor 8b is disposed in confronting relation to the output shaft 6b for detecting the car speed based on the number of r.p.m. of the output shaft 6b. An engine rotation sensor 10 is disposed in confronting relation to the flywheel 1a for detecting the number of r.p.m. of the flywheel 1a to detect the number of r.p.m. of the engine 1.

An electronic control system 9 for controlling the automatic transmission comprises a microcomputer composed of a processor 9a for effecting arithmetic operations, a read-only memory (ROM) 9b storing a control program for controlling the gear transmission 6 and the clutch 3, an output port 9c, an input port 9d, a random-access memory (RAM) 9e for storing the results of the arithmetic operations, and an address and data bus (BUS) 9f interconnecting the processor 9a, the ROM 9b, the output and input ports 9c, 9d, and the RAM 9e. The output port 9c is connected to the throttle actuator 1b, the clutch actuator 3, the hydraulic mechanism 4, and the gear changing actuator assembly 5 and issues drive signals SDV, CDV, PDV, ADV for driving the throttle actuator 1b, the clutch actuator 3, the hydraulic mechanism 4, and the gear changing actuator assembly 5, respectively.

The input port 9d is connected to the clutch actuator sensor 3b, the gear position sensor 6c, the select position sensor 7a, the rotation sensor 8a, the car speed sensor 8b, the engine rotation sensor 10, an accelerator pedal sensor 11a, and a brake pedal sensor 12a (later described) and receives detected signals respectively from these sensors. An accelerator pedal 11 is associated with an accelerator pedal sensor 11a comprising a potentiometer for detecting the extent or depth to which the accelerator pedal 11 has been depressed. A brake pedal 12 is associated with a brake pedal sensor 12a comprising a switch for detecting the extent or depth to which the brake pedal 12 has been depressed.

Figure 4:
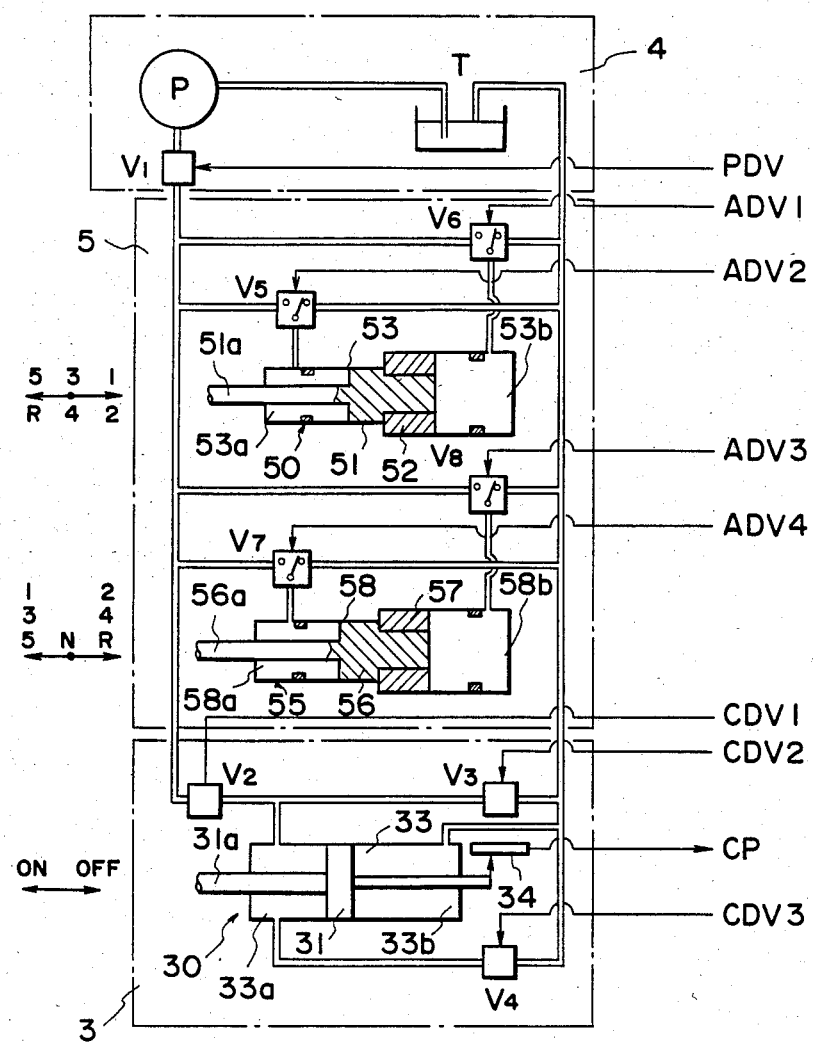
FIG. 4 is a schematic view, partly in cross section, of a clutch actuator, a gear changing actuator, and a hydraulic mechanism in the automatic transmission shown in FIG. 3.

FIG. 4 shows in greater detal the clutch actuator 3, the speed changing actuator assembly 5, and the hydraulic mechanism 4.

The hydraulic mechanism 4 is composed of a tank T, a hydraulic pump P, and an on-off valve $V_1$.

The clutch actuator 3 comprises a cylinder assembly 30 composed of a cylinder 33, a piston 31 slidably disposed therein, and a piston rod 31a (3a in FIG. 3) having one end connected to the piston 31 and an opposite end to the release lever 2a of the clutch 2. The cylinder 33 has a fluid chamber 33a communicating with the pump P through on-off valve $V_2$ and on-off valve $V_1$, and also with the tank T through on-off valve $V_3$ and on-off valve $V_4$ which is pulse-controlled. The cylinder 33 has another fluid chamber 33b communicating with the tank T at all times. A position sensor 34 (3b in FIG. 3) detects an operated position of the piston rod 31a to thereby issue a signal indicative of the corresponding extent to which the clutch 2 is engaged.

When the on-off valve $V_2$ is opened by a drive signal $CDV_1$ from the electronic control system 9, a hydraulic pressure is supplied from the pump P to the fluid chamber 33a to displace the piston 31 to the right (in FIG. 4), thereby disconnecting the clutch 2. When the on-off valves $V_3$, $V_4$ are opened by drive signals $CDV_2$, $CDV_3$, respectively, from the electronic control system 9, the hydraulic pressure is released from the fluid chamber 33a to displace the piston 31 to the left (in FIG. 4) thus connecting the clutch 2. At this time, the on-off valve $V_4$ is pulse-driven by the drive signal $CDV_3$ to connect the clutch 2 gradually.

The gear changing actuator assembly 5 comprises a select actuator 50 and a shift actuator 55, which can selectively be stopped in three positions. The select actuator 50 is composed of a stepped cylinder 53, a first piston 51 slidably disposed in the stepped cylinder 53, and a second tubular piston 52 slidably disposed in the stepped cylinder 53 and fitted over the first piston 51. Likewise, the shift actuator 55 is composed of a stepped cylinder 58, a first piston 56 slidably disposed in the stepped cylinder 58, and a second tubular piston 57 slidably disposed in the stepped cylinder 58 and fitted over the first piston 56. The first pistons 51, 56 of the select and shift actuators 50, 51 have piston rods 51a, 56a held in engagement with internal levers (not shown) in the gear transmission 6. The stepped cylinder 53 has fluid chambers 53a, 53b one on each side of the pistons 51, 52, and the stepped cylinder 58 has fluid chambers 58a, 58b one on each side of the pistons 56, 57. When a hydraulic pressure is supplied to the fluid chambers 53a and 53b, and fluid chambers 58a and 58b, the actuators 50, 55 are in their neutral position as illustrated in FIG. 4. When a hydraulic pressure acts in the fluid chambers 53a, 58a, the first pistons 51, 56 and the second pistons 52, 57 are moved to the right (in FIG. 4). When a hydraulic pressure acts in the fluid chambers 53b, 58b, only, the first pistons 51, 56 are moved to the left (in FIG. 4).

The fluid chambers 53a, 53b in the select actuator 50 are held in communication, through directional control valves $V_5$, $V_6$, respectively, with the pump P (via the on-off valve $V_1$) and the tank T. The fluid chambers 58a, 58b in the shift actuator 55 are held in communication, through directional control valves $V_7$, $V_8$, respectively, with the pump P (via the on-off valve $V_1$) and the tank T.

In the illustrated condition, the gear transmission 6 is in a neutral position. When fluid chamber 58a is connected to pump P via the directional control valve $V_7$ by a drive signal $ADV_4$ from the electronic control system 15 and the fluid chamber 58b is connected to tank T via directional control valve $V_8$ by a drive signal $ADV_3$, the piston rod 56a is moved to the right to enable the gear transmission 6 to select, for example, a 4th gear position. When a gear changing signal is generated indicating a gear shift from the 4th gear position to, for example, a 5th gear position, the electronic control system 9 applies the drive signals $ADV_3$, $ADV_4$ to fluid chambers 58a, 58b with pump P via the directional control valves $V_8$, $V_7$ so that the shift actuator 55 is returned to the neutral position as shown. Then, the electronic control system 9 issues a drive signal $ADV_1$ to connect fluid chamber 53b with pump P via the directional control valve $V_6$ and a drive signal $ADV_2$ to connect fluid chamber 53a with tank T via the directional control valve $V_5$, thereby moving the piston rod 51a to the left to shift the select actuator 50 to a 5threverse select position. The electronic control system 9 thereafter applies the drive signal ADV$_3$ to connect fluid chamber 58b with pump P via the directional control valve V$_8$ and the drive signal ADV$_4$ to connect fluid chamber 58a with tank T via the directional control valve V$_7$, thus shifting the shift actuator 55 to a 1st-3rd 5th gear position whereupon the gear transmission 6 selects 5th gear.

The directional control valves V$_6$, V$_5$, V$_8$, V$_7$, are operated respectively by the drive signals ADV$_1$, ADV$_2$, ADV$_3$, ADV$_4$ from the electronic control system 9 to alternately actuate the select and shift actuators 50, 55 for enabling the gear transmission 6 to select desired gear positions.

Figure 5:
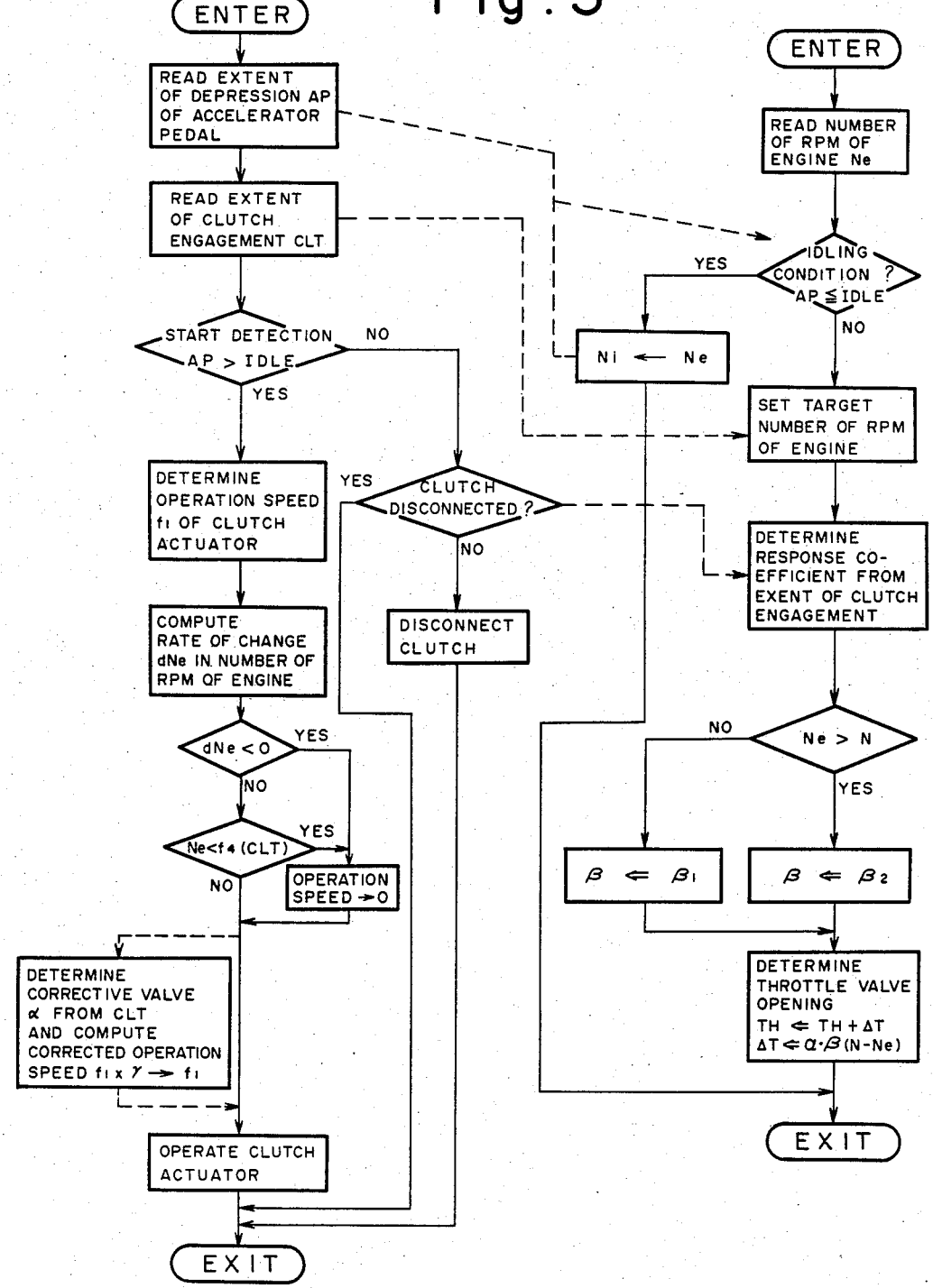
FIG. 5 is a flowchart of progressive steps of operation of the automatic transmission control system according to the method of the invention.

Operation of the arrangement illustrated in FIGS. 3 and 4 according to the starting control method of the invention will now be described with reference to the flowchart of FIG. 5. The flowchart includes a lefthand flow for clutch control and a righthand flow for throttle control, the flows being performed in parallel relationship.

Before entering the processing flows, it is assumed that the vehicle is at rest, the select lever 7 is shifted to the one of the "1", "2", "3", and "D" ranges to disconnect the clutch 2 and the gear transmission 6 is shifted in the 1st gear position.

When the select lever 7 is shifted into the "D" range, for example, to allow a "D" range selection signal SP to be issued from the position sensor 7a through the input port 9d, the processor 9a reads the selection signal SP through the BUS 9f and stores the same in the RAM 9e. Then, the processor 9a issues a drive signal ADV through the output port 9c to the gear changing actuator assembly 5 to operate the same to shift the gear transmission 6 into the 1st gear position. The processor 9a receives a selected gear signal GP from the gear position sensor 6c through the input port 9d to detect that the gear transmission 6 has been shifted to the 1st gear position, and stores the received signal in the RAM 9e.

(1) The processor 9a reads an extent of depression AP of the accelerator pedal 11 from the sensor 11a through the input port 9d and stores the same in the RAM 9e. The processor 9a also reads an extent of engagement CLT of the clutch 2 from the position sensor 34 through the input port 9d and stores the same in the RAM 9e.

(2) Then, the processor 9a compares the extent of depression AP stored in the RAM 9e with an extent of depression IDLE of the accelerator pedal 11 in an idling condition. If AP>IDLE, then the processor 9a decides that the accelerator pedal 11 has been depressed and a vehicle start has been instructed. If AP≦IDLE, then the processor 9a decides that no vehicle start instruction has been issued.

(3) If the accelerator pedal 11 has not been depressed and a vehicle start has not been instructed, then the processor 9a compares with the extent of engagement CLT in the RAM 9e with an extent of engagement CLTo of the clutch as disengaged. If CLT>CLTo, then the clutch is not disconnected, and the clutch will be disconnected. More specifically, the processor 9a issues drive signals CDV$_2$, CDV$_3$ through the output port 9c to open the on-off valves V$_3$, V$_4$ and drive signals PDV, CDV$_1$ through the output port 9c to open the on-off valves V$_1$, V$_2$, thereby introducing a hydraulic pressure into the fluid chamber 33a to move the piston 31 to the right to disconnect the clutch 2. If CLT≦CLTo after the clutch 2 has been disconnected, then the program is ended and returns to the step (1).

Figure 6:
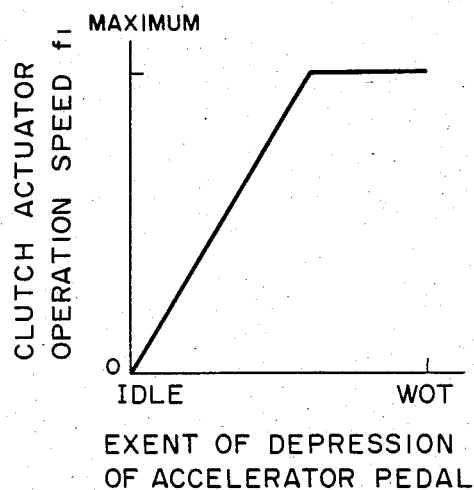
FIG. 6 is a diagram showing the relationship between the extent of depression of an accelerator pedal and the speed at which a clutch is operated according to the present invention.

(4) If it is decided in the step (2) that a vehicle start is instructed, then the processor 9a determines a speed f$_1$ at which the clutch actuator 3 should be operated, operation speed map data having been stored in the RAM 9e in advance. More specifically, the RAM 9e stores the data on the correspondence between the extent of depression AP of the accelerator pedal 11 and the operation speed f$_1$ of the clutch actuator 3, as shown in FIG. 6. The processor 9a searches the map data based on the extent of depression AP stored in the RAM 9e for the corresponding operation speed f$_1$.

(5) Then, the processor 9a reads the number of r.p.m. Ne(t) of the engine from the rotation sensor 10 through the input port 9e, and determines a rate of change which is the difference between the number of r.p.m. Ne(t) and the previous number of r.p.m. Ne(t−1) of the engine which has been read and stored in the RAM 9e according to the following equation:

$$dNe = Ne(t) - Ne(t-1) \tag{1}$$

The processor 9a then replaces the number of r.p.m. in the RAM 9e with Ne(t).

Figure 9:
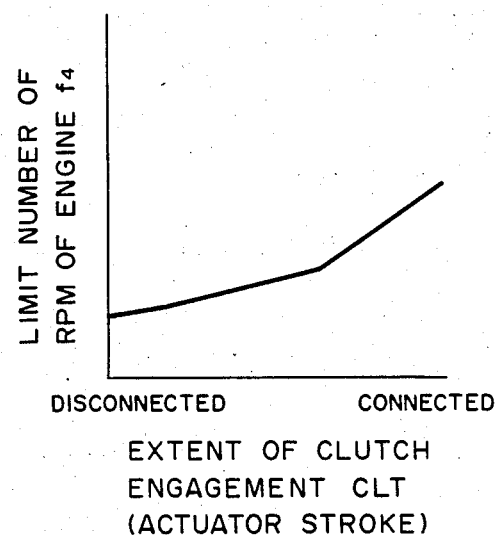
FIG. 9 is a diagram showing the relationship between the extent of engagement of a clutch and the limit number of r.p.m. of an engine according to the present invention.

(6) The processor 9a then determines if the determined rate of change dNe is negative or not. If dNe<0, then the processor 9a decides that the engine load is increasing, and the program goes to a step (7). If dNe≧0, then the detection of an increase in another engine load is effected. More specifically, the relationship between the limit number of r.p.m. f$_4$ of the engine and the extent of engagement CLT of the clutch such that no engine power output shortage will result is determined beforehand as shown in FIG. 9, and is stored as map data in the RAM 9e. The processor 9a determines the corresponding limit number of r.p.m. f$_4$ (CLT) from the RAM 9e based on the extent of clutch engagement CLT detected in the step (1). The processor 9a then compares the number of r.p.m. Ne of the engine detected in the step (5) with the limit number of r.p.m. f$_4$ (CLT) of the engine. If Ne<f$_4$ (CLT), then the processor 9a decides that the engine load is increasing and the engine suffers an output power shortage, and the program proceeds to a step (7). If Ne≧f$_4$ (CLT)), then the processor 9a decides that the engine load is not increasing, and the program goes to a step (8).

(7) If dNe<0 or Ne<f$_4$ (CLT), then the operation speed f$_1$ determined in the step (4) and stored in the RAM 9e is set to zero. That is, the clutch operation speed f$_1$ is selected to be zero so that the clutch connecting operation is stopped.

Figure 12:
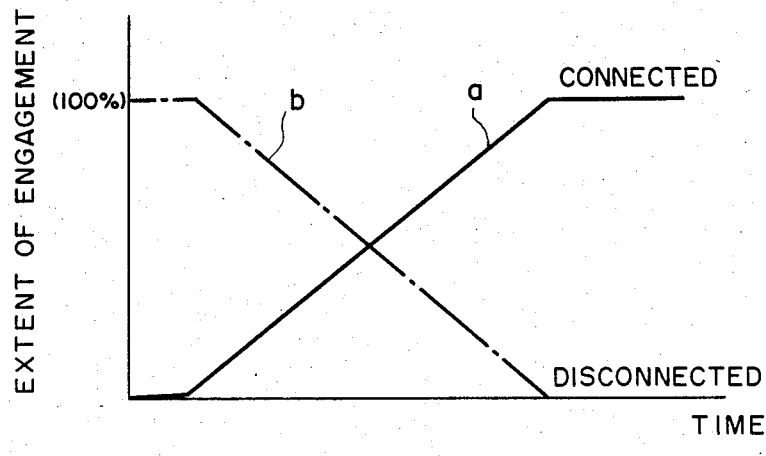
FIG. 12 is a diagram showing the operation of a clutch in the automatic transmission of FIG. 3 in relation to time.

(8) Then, the processor 9a delivers the clutch drive signal CDV for the operation speed f$_1$ through the output port 9c to the clutch actuator 3, which gradually moves the piston rod 3a to the left to thereby move the release lever 2a gradually to the left. The clutch 2 is now varied in its extent of engagement, as shown in FIG. 12, so that it will be changed from a disconnected condition through an incompletely connected condition to a connected condition.

When the operation speed f$_1$ is zero, the clutch actuator 3 stops its operation and the clutch connecting operation is stopped. Where it is necessary at this time to correct the torque characteristics with respect to the extent of accelerator pedal depression into substantially linear characteristics, steps (6) or (7) are followed by a step indicated by the dotted lines in FIG. 5. More specifically, the processor 9a determines a corrective value γ from the extent of clutch engagement CLT detected from the RAM 9e. The RAM 9e stores map data on the extent of clutch engagement CLT against the corrective value γ as shown in FIG. 10. The characteristics shown in FIG. 10 are substantially inversely proportional to the torque characteristics of the clutch as illustrated in FIG. 2. Therefore, the processor 9a searches the map data to find the corrective value γ (CLT) corresponding to the extent of clutch engagement CLT.

The processor 9a uses the determined corrective value γ (CLT) to correct the operation speed $f_1$ determined in the step (4) according to the following formula:

$$f_1 \leftarrow f_1 \times \gamma \qquad (2)$$

Stated otherwise, the determined operation speed $f_1$ is multiplied by the corrective value γ to obtain a corrected operation speed $f_1$.

Then, the processor 9a delivers the clutch drive signal CDV at the corrected operation speed $f_1$ through the output port 9c to the clutch actuator 3, which displaces the piston rod 3a gradually to the left to move the release lever 2a gradually to the left. The clutch 2 is now varied in its extent of engagement, as shown at a in FIG. 12, so that it will be changed from a disconnected condition through an incompletely connected condition to a connected condition. When the operation speed $f_1$ is zero, the clutch actuator 3 stops its operation and the clutch connecting operation is stopped.

The foregoing cycle is repeated until the clutch 2 is connected. When the extent of depression AP of the accelerator pedal is varied while the clutch 2 is being operated upon, the operation speed $f_1$ of the clutch 2 is varied accordingly, and the operation speed $f_1$ is corrected dependent on the extent of clutch engagement.

When an increase in the engine load is detected while the clutch is thus operated upon, the operation of the clutch 2 is stopped. When the increase in the engine load is eliminated as the number of r.p.m. of the engine is increased, the clutch 2 is controlled again so as to be connected at the redetermined operation speed $f_1$.

Processing for the control of the throttle valve is effected in parallel relationship to the foregoing control of the clutch 2.

(a) The processor 9a reads the number of r.p.m. Ne of the engine from the engine rotation sensor 10 through the input port 9d and stores the same in the RAM 9e.

(b) The processor 9a then compares the extent of depression AP read into the RAM 9e in the above step (1) with the extent of depression IDLE in the idling condition. If AP≦IDLE, then the processor 9a decides that the engine is in the idling condition, stores the detected number of r.p.m. Ne of the engine as the number of r.p.m. Ni of the engine as it is idling in the RAM 9e, ends the program and goes back to the step (a).

Figure 7:
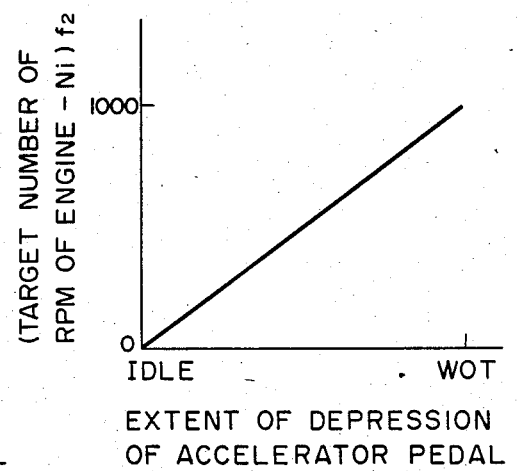
FIG. 7 is a diagram showing the relationship between the extent of depression of an accelerator pedal and the optimum number of r.p.m. of an engine according to the present invention.
Figure 8:
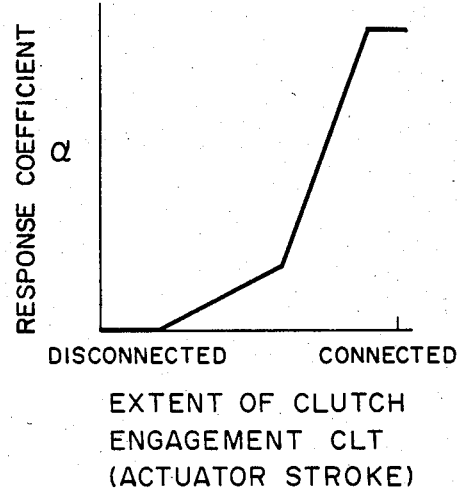
FIG. 8 is a diagram showing the relationship between the extent of engagement of a clutch and a response coefficient according to the present invention.

(c) If AP>IDLE, then the processor 9a decides that the accelerator pedal has been depressed and establishes a target number of r.p.m. of the engine. Map data on the correspondence between the extent of depression AP of the accelerator pedal 11 and the difference between the target number of r.p.m. N of the engine and the number of r.p.m. Ni of the engine as it is idling, $f_2$, as shown in FIG. 7, is stored in the RAM 9e. The processor 9a searches the map data for the number of r.p.m. $f_2$ (AP) corresponding to the extent of depression AP. Then, the processor 9a reads the number of r.p.m. Ni of the engine as it is idling from the RAM 9e and determines the target (optimum) number of r.p.m. N of the engine according to the following equation:

$$N = Ni + f_2 (AP) \qquad (3)$$

This equation achieves the optimum target number of r.p.m. N of the engine even if the number of r.p.m. of the engine as it is idling is varied due to an automatic choke or varied with time.

(d) Then the processor 9a determines a response coefficient α. To this end, the RAM 9e stores map data on the correspondence between the extent of clutch engagement CLT and the response coefficient α. The processor 9a searches the map data based on the extent of clutch engagement CLT read and stored in the RAM 9e in the step (1) for the corresponding response coefficient α, and then stores the response coefficient α in the RAM 9e. The response coefficient α is representative of response characteristics for the opening and closing of the throttle valve. The greater the extent of clutch engagement CLT, the larger the response coefficient α. Stated otherwise, the greater the clutch torque, the larger the response coefficient and the larger the degree to which the throttle valve is opened and closed.

(e) Then, the processor 9a compares the number of r.p.m. Ne of the engine stored in the RAM 9e in the step (a) and the target number of r.p.m. N of the engine determined in the step (c). If Ne>N, then the processor 9a sets a response coefficient β to $β_2$ since the throttle valve is excessively opened. If Ne≦N, then the processor 9a sets the response coefficient β to $β_1$ since the throttle valve is insufficiently opened. The response coefficients have the relationship $β_1 > β_2 > 0$. With the response coefficient $β_2$ for the degree of closing of the throttle valve being smaller than the response coefficient $β_1$ for the degree of opening of the throttle valve, hunting can be prevented from being caused.

(f) The processor 9a then determines the degree of opening TH of the throttle valve. More specifically, the RAM 9e stores a previous degree of opening TH of the throttle valve and determines the desired degree of opening of the throttle valve according to the following equations:

$$TH = TH + \Delta T \qquad (4)$$

$$\Delta T = \alpha \cdot \beta \cdot (N - Ne) \qquad (5)$$

The extent ΔT to which the throttle valve is to be opened or closed is determined by the difference (N−Ne) between the target number of r.p.m. of the engine and the current number of r.p.m. of the engine, and the response coefficients α, β. If N>Ne, ΔT is positive or indicative of an opening extent when opening the throttle valve, and if N<Ne, ΔT is negative and indicative of a closing extent when closing the throttle valve. If N>Ne, then $β = β_2$ and the response becomes great and if N<Ne, then $β = β_1$ and the response becomes small and is dependent on the extent of clutch engagement CLT. The opening or closing extent ΔT is added to the previous degree of opening TH of the throttle valve to produce the current degree of opening TH of the throttle valve which is stored in the RAM 9e. A drive signal SDV corresponding to the degree of opening TH of the throttle valve is applied through the output port 9c to the throttle actuator 1b, which then turns the throttle valve to the specified degree of opening of the throttle valve. Thereafter, the program goes back to the step (a), and the above process is repeated.

The throttle valve gradually reaches the target degree of opening, and hence the number of r.p.m. of the engine gradually reaches the target number of r.p.m. The response representing the rate at which the target throttle opening are reached is varied as $\alpha$ dependent on the extent of clutch engagement CLT and the difference between the numbers of r.p.m. of the engine, and as $\beta$ dependent on whether the throttle valve is opened or closed.

While the clutch is operated through the repetition of the steps (1) through (9), the throttle valve is controlled so as to be opened or closed through the repetition of the steps (a) through (f). The clutch is connected at the optimum clutch speed and the optimum number of r.p.m. of the engine to start the vehicle.

Subsequently, the processor 9a receives a detected signal WP from the speed sensor 8b through the input port 9d to compute a car speed V, stores the computed car speed V, and searches a shift map based on the car speed V and the accelerator pedal depression AP stored in the RAM 9e for an optimum gear position.

Figure 11:
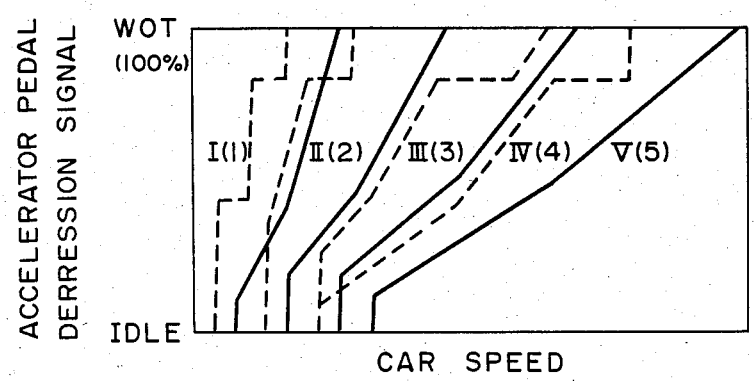
FIG. 11 is a diagram illustrating a gear shift map for determining gear positions in the automatic transmission shown in FIG. 3.

The shift map, as shown in FIG. 11, is stored as a table SM in the ROM 9b and is dependent on the car speed V and the accelerator pedal depression AP. The shift map has areas representative of gear positions I, II, III, VI, V which are bounded by solid lines at the time the gears are shifted up and by dotted lines at the time the gears are shifted down. Therefore, the shift map is a mixture of a shift-up map and a shift-down map.

The processor 9a relies on the shift map to determine an optimum gear position dependent on the car speed V and the accelerator pedal depression AP. If the optimum gear position is different from the current gear position of the gear transmission 6, the processor 9a delivers the clutch drive signal CDV to the clutch actuator 3 through the output port 9c. A hydraulic pressure is now introduced into the fluid chamber 33a in the cylinder 33 of the clutch actuator 3 to move the piston rod 3a (31a) to the right to return the release lever 2a to the right, thus gradually disconnecting the clutch as shown at b in FIG. 12. The processor 9a issues the drive signal ADV which will select the determined gear position to the gear changing actuator assembly 5 through the BUS 9f and the output port 9c.

The gear changing actuator assembly 5 is then connected to the hydraulic mechanism 4 to hydraulically control the select and shift actuators 50, 55 for operating the gear transmission 6 to bring gears into synchronous mesh in the desired gear position.

When the gear changing operation is completed, the processor 9a sends the clutch drive signal CDV to the clutch actuator 3 as when the car is to be started, thereby connecting the clutch.

While in the foregoing embodiment the electronic control system 9 is shown and described as being composed of the single processor 9a, the electronic control system may comprise a plurality of processors for processing the above clutch and throttle valve controlling operations.

Although a certain preferred embodiment has been shown and described, it should be understood that many changes and modifications may be made therein without departing from the scope of the appended claims.

What is claimed is:

1. A method of controlling the starting of a vehicle having an engine, an automatic clutch, and an electronic control system, comprising the steps of:
    (a) controlling the clutch to be engaged,
    (b) detecting the number of r.p.m. of the engine;
    (c) detecting the extent of engagement of the clutch;
    (d) determining a limit number of r.p.m. of the engine corresponding to the detected extent of engagement of the clutch; and
    (e) stopping the engagement of the clutch when the number of r.p.m. of the engine detected in step (b) is less that the limit number of r.p.m.

2. A method of controlling the starting of a vehicle having an automatic clutch and an electronic control system which detects the extent of depression of an accelerator pedal and determines the speed of operation of a clutch actuator based on the detected extent of depression of the accelerator pedal, comprising the steps of:
    (a) detecting an extent of engagement of the clutch;
    (b) determining a corrective value to correct a speed of operation of the clutch based on the detected extent of engagement of the clutch; and
    (c) controlling the clutch to be connected at a speed which is obtained by correcting a speed of operation of the clutch as determined by the electronic control system with the corrective value.

* * * * *